Aug. 11, 1970   B. L. GODBERSEN   3,523,585
HARROW STRUCTURE

Original Filed Nov. 23, 1966

INVENTOR
BYRON L. GODBERSEN
BY
ATTORNEY

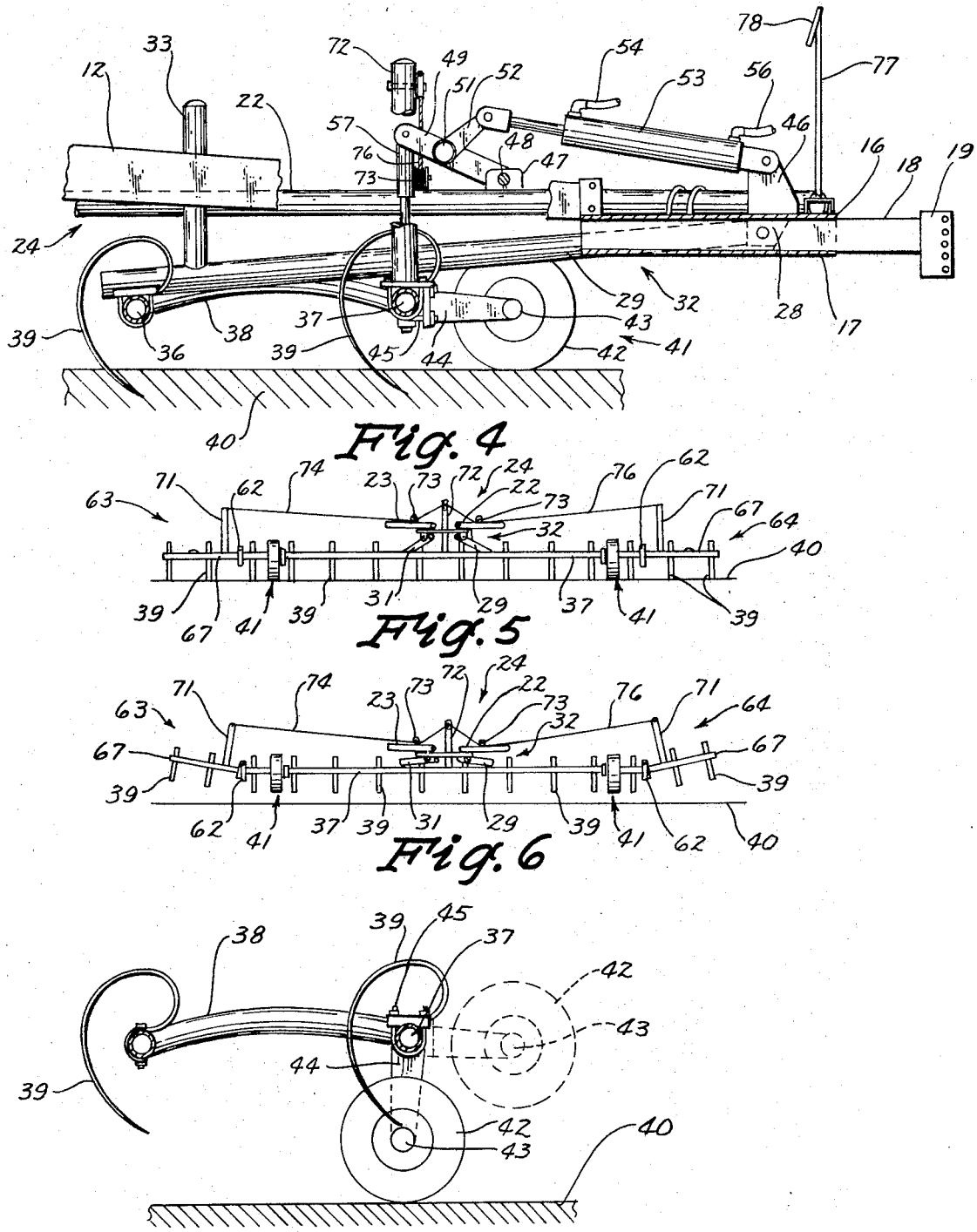

United States Patent Office 3,523,585
Patented Aug. 11, 1970

3,523,585
HARROW STRUCTURE
Byron L. Godbersen, Ida Grove, Iowa 51445
Continuation of application Ser. No. 596,530, Nov. 23, 1966. This application June 20, 1969, Ser. No. 836,220
Int. Cl. A01b 63/102
U.S. Cl. 172—456        6 Claims

ABSTRACT OF THE DISCLOSURE

This invention relates to a harrow structure which is detachably mounted to a prime mover, and to which a planter or other such apparatus may be attached in tandem therewith, and with the harrow comprising a wheel mounted frame to which a tool carrying subframe is pivotally connected at one end and vertically adjustably connected at the other end for vertical movement independent of the main frame.

---

This application is a continuation of application No. 596,530, filed on Nov. 23, 1966, and now abandoned.

This invention relates generally to farm implements pulled by a tractor or other type of prime mover and in particular to a harrow structure adapted to be connected to a prime mover.

To prepare a proper seedbed and to plant a field, the ground is first broken as by plowing, then leveled with the soil left in a loose condition by harrowing, and finally planted by the use of a planter. The agriculturist fights a continuous battle with nature. After preparing the seedbed, nature often steps in before planting with a rainfall and produces a rain-crusted field thus requiring the farmer to make another pass over the field with the harrow.

Conservation of moisture in the ground is another problem. Every time an implement is passed over the field thus disturbing the ground, moisture is lost. If, however, the time interval between each step is reduced, moisture can be conserved.

Thus time, also, is an important factor. If the number of steps can be reduced and greater areas can be covered as the implement is pulled across the field, not only is time saved, but costs are reduced. Not all fields, however, are level. Depressions and slopes can prevent some of the teeth of the present day harrow from engaging the ground, thus necessitating additional passes. Furthermore, due to the need for tilling the ground adjacent waterways and their attendant slopes, the contemporary harrow will often gouge the slope upon a diagonal approach thereto, resulting in damage to the harrow.

It is therefore an object of this invention to provide an improved harrow apparatus.

It is another object of this invention to provide a harrow structure adapted to be mounted between a prime mover and a planter, wherein by use of the harrow structure the ground is leveled, the soil is left in a loose condition without tractor wheel compacted paths, and the seed is planted—all in one operation.

Another object of this invention is the provision of a harrow structure adapted to be mounted between a prime mover and a planter, the use of which reduces planting time and costs, conserves moisture, avoids erosion, reduces compaction, and prepares the best seedbeds.

A further object of this invention is the provision of a harrow structure to which additional wing sections can be added to increase the area covered by the harrow, the wings being pivotally mounted thus allowing maximum engagement of all the teeth with the ground.

Yet another object of this invention is to provide a harrow structure wherein the teeth are hydraulically moved between a ground engaging position and a transport position raised above the ground.

Yet a further object of this invention is to provide a harrow structure having pivotally mounted wings mounted thereon, wherein upon moving the teeth of the structure from a ground engaging position to a transport position, the wings are automatically moved to a transport position thus both obviating the gouging of adjacent slopes, and allowing for road travel and storage.

A still further object of this invention is the provision of a harrow structure having swingably adjustable rotatable gauge wheels which provide accurate depth control of the penetration of the teeth in the ground.

Another object of this invention is to provide a harrow structure having arcuately adjustable gauge wheels to facilitate the manual movement of the structure thus allowing easy hook-up with the planter and/or the prime mover.

A further object of this invention is the provision of a harrow structure which is adapted to be connected between a planter and a prime mover, or which can be converted to a utility harrow and operated without the planter.

Still another object of this is to provide a harrow structure comprising structural elements arranged to attain the objects listed hereinbefore, which apparatus is rugged of structure, economical of manufacture, and effective in service.

These objects and other features and advantages of this invention will become more readily apparent upon reference to the following description when taken in conjunction with the accompanying drawings, wherein:

FIG. 4 is a fragmentary sectional view taken along the line 4—4 in FIG. 2;

FIG. 5 is a sectional front elevational view of the harrow structure with the teeth engaged with the ground;

FIG. 6 is a sectional front elevational view with the teeth poised over the ground; and FIG. 7 is a partial side elevational sectional view taken along the line 7—7 in FIG. 1 showing in particular the swingably adjustable wheels.

Figure 1:
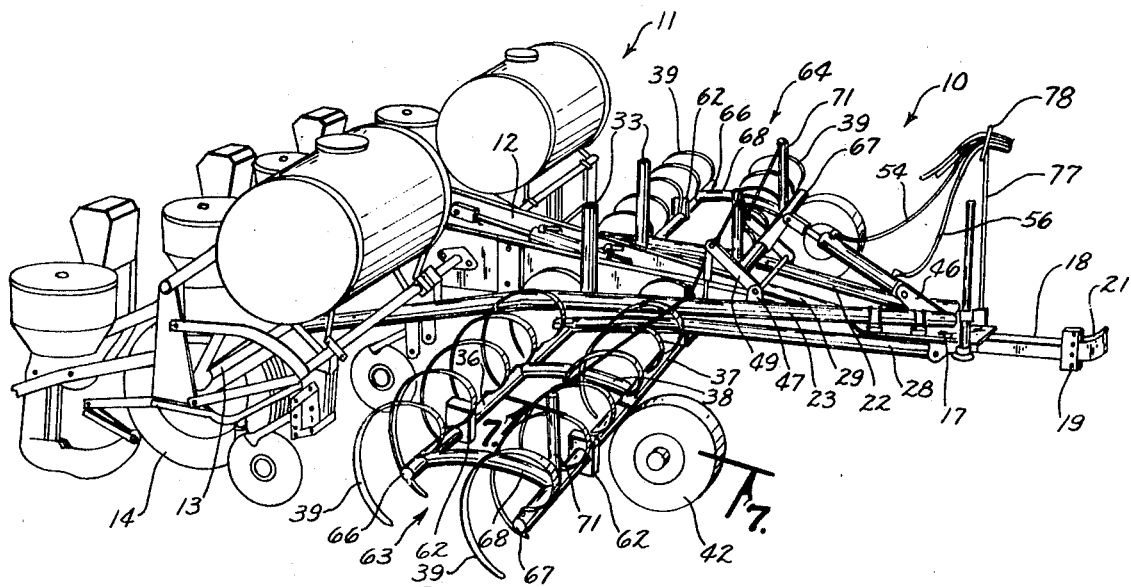
FIG. 1 is a perspective view of the harrow structure of this invention mounted on a conventional planter.

Referring to the drawings, the harrow structure of this invention is indicated generally at 10 in FIG. 1 attached to a conventional planter 11. The planter 11 has a main frame 12, a transversely extending drawbar 13 secured to the rear end of the frame 12, and a pair of axially aligned rotatable wheels 14, with only one being shown in FIG. 1, mounted on the drawbar.

More specifically, the harrow structure 10 includes a mounting plate 16 (FIGS. 2 and 4) having a U-shaped channel 17 (FIG. 4) axially mounted on the underside thereof. Slideably mounted in the channel 17 is a horizontally adjustable tongue 18 having a vertically adjustable hitch unit 19 mounted on the forward end adapted to be secured to a drawbar 21 (FIG. 1) of a prime mover (not shown).

A pair of substantially horizontally disposed bowed arms 22 and 23 (FIG. 1) form a first V-shaped frame 24 (FIG. 2), with the apex thereof secured to the top of the plate 16 by a plurality of U bolts 26 (FIG. 2) and with the free ends extended rearwardly from the plate 16. The free ends of the first frame 24 are adapted to be mounted on the drawbar 13 (FIG. 1) of the planter 11, and the forward end of the planter frame 12 is adapted to be detachably secured to the plate 16.

Laterally mounted on opposite sides of the channel 17 to the plate 16 are a pair of mounting brackets 28, only one being shown in FIG. 4. A pair of rods 29 and 31 (FIG. 2) forming a second V-shaped frame 32 disposed below the first frame 24, are each pivotally mounted to one of the brackets 28 (FIG. 4) with the free ends thereof extended rearwardly. When in a raised position, the rods 29 and 31 are substantially horizontal. As best noted in FIGS. 5 and 6, the second frame 32 is movable vertically relative to the first frame 24.

Each of the rods 29 and 31 (FIG. 2) has an upstanding guide post 33 attached near the free end thereof with arms 22 and 23 being disposed in juxtaposed relation laterally therefrom, which substantially prevents horizontal movement of the second frame 32 relative to the first frame 24.

Mounted on and extended laterally to the second frame 32 are a pair of parallel spaced bars 36 and 37 (FIG. 2), with the bar 36 secured to the free ends of the rods 29 and 31 and with the bar 37 secured intermediate the apex and the base of the second frame 32 or forward of the bar 36. A pair of cross bars 38 (FIG. 1), each laterally disposed on opposite sides of the second frame 32, rigidly interconnects the bars 36 and 37. Each of the bars 36 and 37 has a plurality of arcuately formed spring teeth 39 mounted thereon adapted to engage the ground 40 (FIG. 4).

Adjustably affixed to each bar 37 (FIG. 7) at any one of a plurality of arcuately spaced positions completely around the periphery thereof, is a gauge wheel assemblage 41 each having a wheel 42 rotatably mounted on a spindle 43 which in turn is secured to a mounting unit 44. Each mounting unit 44 is affixed to the bar 37 by a pair of U bolts 45.

Figure 2:
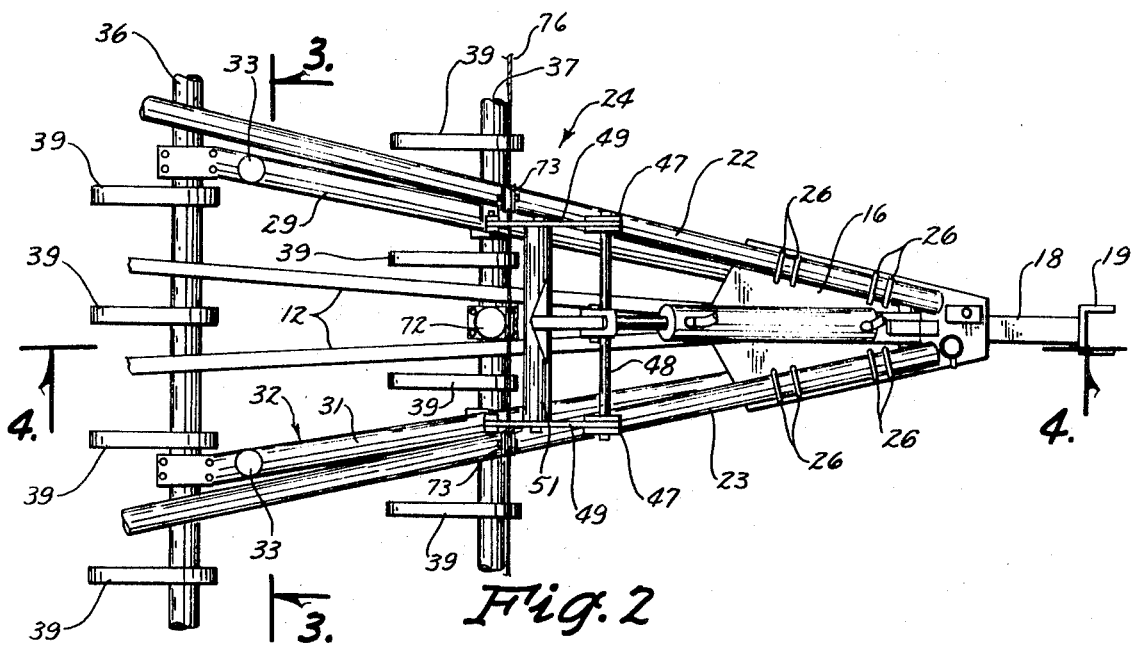
FIG. 2 is a fragmentary, top plan view of the harrow structure.
Figure 3:
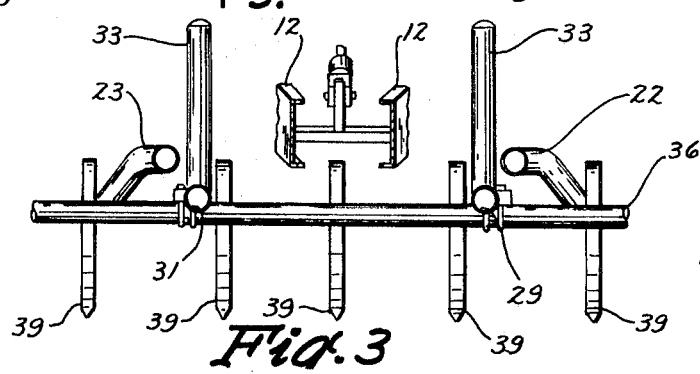
FIG. 3 is a fragmentary sectional view taken along the line 3—3 in FIG. 2.

An upstanding coupler 46 (FIG. 4) is secured to the plate 16 intermediate the arms 22 and 23 (FIG. 1). Attached, as by welding, to each of the arms 22 and 23 intermediate the ends thereof is an upstanding U-shaped element 47 (FIGS. 2 and 4). The elements 47 are transversely aligned and receive an elongated pin 48 extended through and laterally beyond the elements 47. A pair of inclined links 49 are pivotally mounted on one end thereof to the pin 48 at the elements 47. The links 49 are transversely aligned and receive an elongated bar 51 extended therebetween. A connector 52 is attached to the center of the bar 51 and extends substantially forwardly therefrom. A hydraulic assembly 53 (FIG. 4), pivotally attached on one end to the connector 52 and on the other end to the coupler 46, is fluidly connected by a pair of hoses 54 and 56 to the hydraulic system of the tractor (not shown).

A pair of substantially vertically disposed shafts 57, having an adjustable length, are each pivotally connected on one end to the free end of the links 49 and on the other end to the rods 29 and 31, as best noted in FIG. 4.

Each bar 36 and 37 has a pair of hinges 62 (FIG. 1) each mounted on opposite ends of the bars. A pair of vertically movable wings 63 and 64 are mounted on opposite ends of the bars 36 and 37 at the hinges 62. Each wing 63 and 64 includes a pair of parallel wing bars 66 and 67, pivotally mounted to the hinges 62 and extending coaxially outwardly from the bars 36 and 37. A wing cross bar 68 rigidly interconnects the wing bars 66 and 67 intermediate the ends thereof. Mounted on each of the wing bars 66 and 67 are a plurality of spaced spring teeth 39, identical to the teeth mounted on the bars 36 and 37.

Mounted on each wing bar 67, adjacent the wing cross bar 68, is an upstanding pole 71 (FIGS. 1 and 5). A third upstanding pole 72 is mounted on the rod 29 behind and adjacent to the shaft 57 mounted thereon. Mounted on each arm 22 and 23 is a pulley unit 73. The units 73 and poles 71 and 72 are in substantially transverse alignment relative to the frames 24 and 32. A pair of lines 74 and 76 are each secured on one end to the top of the third pole 72, threaded through the pulley units 73, and secured on the other end to the poles 71, as best noted in FIG. 5. The lines 74 and 76 are slideably secured at the pulley units 73 and fixed at both ends to the poles 71 and 72 for a purpose hereinafter described.

An upstanding holding stake 77 shown in FIG. 1 having an annular holder 78 formed on the outer end thereof, is mounted on the forward edge plate 16, as by welding. The purpose of the stake 77 and holder 78 is to support the hydraulic hoses 54 and 56 of the harrow structure 10 and the hydraulic hoses of the planter 11.

The harrow structure 10 (FIG. 1) is easily mounted on the planter 11. The tongue 18 is grasped and the structure is rolled on the wheels 42. The planter frame 12, straddled by both the first and second frame 24 and 32, has the forward end of the planter frame 12 secured to the plate 16 and the free end of the arms 22 and 23 attached to the drawbar 13 of the planter. The hitch unit 19 is attached to the drawbar of the prime mover 19, and the hydraulic hoses 54 and 56 are fluidly connected to the hydraulic system of the tractor.

The first frame 24 remains supported in a substantially horizontal plane by the planter 11 and the prime mover. Operation of the hydraulic assembly 53 allows the operator to move the second frame 32 vertically relative to the first frame 24.

When the second frame 32 is moved vertically into a juxtaposed position relative to the first frame 32 (FIG. 6), the teeth and gauge wheel assemblages 41 are in a position poised over the ground. The wings 63 and 64, simultaneously with the movement of the second frame 32, move from a substantially horizontal position to an angularly inclined position or transport position. It will be noted in FIG. 5 that the lines 74 and 76 are taut when the wings 63 and 64 are in a horizontal position. Therefore, upon movement of the second frame 32, the upper end of the third pole 72 is moved upwardly away from the first frame 24, the lines slide through the pulley units 73 and the wings are caused to be moved. Upon movement of the wings from a horizontal position, further movement, wherein the wings are positioned in the vertical or even further to an inclined position over the gauge wheel assemblages, can readily be accomplished by manual operation, thus allowing the structure 10 to be transported through narrow gates and on the road.

Upon arrival in the field, the wings 63 and 64 are manually moved to their inclined position as best noted in FIG. 6; and, upon operation of the hydraulic assembly 53, the second frame 32 is moved downwardly wherein the wheels 42 support the frame 32 and the teeth 39 engage the ground as shown in FIG. 5. If it is desired to change the depth of penetration of the teeth with the ground 40, the wheel assemblages 41 are adjusted to any one of a plurality of arcuately spaced positions completely around the periphery of the bars 37 by loosening the U bolts 45. Depth of penetration of the teeth can also be adjusted by rotation of the bars 36, 37, 46 and 47.

During the actual harrowing and planting as the combined unit moves across the field, effective harrowing will be accomplished even though the field is not strictly level, as the wings 63 and 64 will pivot vertically thus allowing the teeth of the main structure to maintain proper penetration of the ground while the wing teeth penetrate the ground on the slopes. Importantly, should the harrow structure approach in a diagonal manner a slope extending upwardly and away from the field being tilled, the wings 63 and 64 again can be raised, whereby to obviate gouging the slope with the teeth of either wing, and preventing bending or breaking any portion of the particular wing which under ordinary circumstances would engage the soil of the slope.

As the harrow structure, although mounted on the planter, operates independently thereof, it can be raised to allow precision work on headlands, waterways, and on end rows.

When it is desired to move the structure 10 when disconnected from the planter 11, the wheel assemblages 41 can be moved 180° from in front of the bar 37, as shown in full lines in FIG. 7, to a position between the bars 36 and 37, as shown in dotted lines. The center of weight of the structure now being over the wheels aids in the movement of the structure.

Although the structure as defined hereinabove is mounted on a planter, it can be used independently thereof. A carrying dolly (not shown) comprising a main frame having spindle mounted wheels thereon, can be substituted for the planter and attached to the free ends of the arms 22 and 23. The harrow structure, in this event, is supported between the tractor and the dolly and the operation as described hereinabove is applicable.

Although a preferred embodiment of this invention has been described and disclosed hereinbefore, it is to remembered that various modifications and alternate constructions can be made thereto without departing from the true spirit and scope of the invention.

I claim:
1. A harrow structure comprising in combination:
   wheeled frame means adapted to be connected to a prime mover, and including a pair of converging substantially horizontally disposed arms forming a first frame with the apex thereof adapted to be connected to the prime mover and with the base thereof extended rearwardly from the prime mover;
   teeth means pivotally attached to said frame means and movable from a first position posed over the ground to a second position engaged with the ground, said teeth means including a pair of converging rods forming a second frame pivotally mounted at the apex thereof to the apex of said first frame, and with the base thereof extended rearwardly from the prime mover and disposed below the base of said first frame, said second frame movable vertically relative to said first frame;
   means operably connected to said frame means and to said teeth means for moving said teeth means from said first position to said second position, and including a cylinder mounted on said first frame and fluidly connected to the prime mover, a piston reciprocally mounted in said cylinder and operable in response to the application thereto of fluid under pressure from the prime mover, a piston rod connected to said piston and having a free end extending outwardly from said cylinder, and linkage mounted on said free end interconnecting said first frame and said second frame, said linkage operable to vertically move said second frame; and
   a pair of upstanding guide posts mounted one on each of said rods with said arms disposed outwardly of said posts, thus substantially restricting lateral movement of said second frame relative to said first frame.

2. A harrow structure as defined in claim 1, wherein said teeth means includes a plurality of parallel spaced bars extended laterally to and mounted on said second frame, each of said bars having a plurality of spaced teeth mounted thereon, said second frame movable from a first position wherein said teeth are poised over the ground to a second position wherein said teeth engage the ground.

3. A harrow structure as defined in claim 2 wherein a pair of wings are pivotally mounted on opposite ends of said bars and extend coaxially outwardly therefrom, said wings being movable from a first position angularly inclined relative to the normally horizontal plane of said bars to a second position in axial alignment with said bars, said wings having a plurality of teeth mounted thereon adapted to engage the ground in said second position.

4. A harrow structure as defined in claim 3, and including further a pair of rotatable wheels for said second frame, said wheels adjustably affixed to said bars at any one of a plurality of positions arcuately spaced around the periphery of said bars.

5. A harrow structure as defined in claim 4, and including further lift means mounted on said frame and operably connected to said first frame and to said wings, said lift means operable to move said wings from their second position to their first position in response to upward movement of said second frame.

6. A harrow structure as defined in claim 5, and further wherein said lift means includes an upstanding first pole mounted on said second frame, a pair of upstanding second poles, each mounted on one of said wings, and a pair of lines each mounted at one end thereof to said first pole and at the other end thereof to one of said second poles, said lines slideably secured intermediate the ends thereof to said first frame and operable, in response to upward movement of said second frame, to move said wings from their second position to their first position.

References Cited

UNITED STATES PATENTS

| 3,314,386 | 4/1967 | Kopaska | 172—456 X |
| 3,362,483 | 1/1968 | Twidale | 172—456 X |

FOREIGN PATENTS

| 1,329,769 | 5/1963 | France. |

ROBERT E. PULFREY, Primary Examiner

A. E. KOPECKI, Assistant Examiner

U.S. Cl. X.R.

172—311, 421